US006244488B1

(12) United States Patent
Tanaka (10) Patent No.: US 6,244,488 B1
(45) Date of Patent: *Jun. 12, 2001

(54) METHOD AND APPARATUS FOR CUTTING OPTICAL FIBER

(75) Inventor: Toshiyasu Tanaka, Yokohama (JP)

(73) Assignee: Asahi Kohden Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,563

(22) PCT Filed: May 23, 1997

(86) PCT No.: PCT/JP97/01745

§ 371 Date: Jan. 22, 1998

§ 102(e) Date: Jan. 22, 1998

(87) PCT Pub. No.: WO97/44691

PCT Pub. Date: Nov. 27, 1997

(30) Foreign Application Priority Data

May 23, 1996 (JP) .................................... 8-151676

(51) Int. Cl.[7] .................................................. C03B 37/16
(52) U.S. Cl. .......................................... 225/96.5; 225/103
(58) Field of Search ............................. 225/2, 96.5, 103

(56) References Cited

U.S. PATENT DOCUMENTS

| 4,229,876 | * | 10/1980 | Doty .................................... 225/96.5 |
| 4,445,632 | | 5/1984 | Margolin et al. ........................ 225/2 |
| 4,503,744 | * | 3/1985 | Garner et al. ............................ 225/2 |
| 4,621,754 | * | 11/1986 | Long et al. .............................. 225/2 |
| 4,667,862 | * | 5/1987 | Millar et al. ............................ 225/2 |
| 4,688,707 | * | 8/1987 | Szostak et al. ......................... 225/2 |
| 5,108,021 | * | 4/1992 | Vines ..................................... 225/2 |
| 5,125,549 | * | 6/1992 | Blackman et al. .................. 225/96.5 |
| 5,460,311 | | 10/1995 | Fan ........................................ 225/96 |
| 5,644,672 | | 7/1997 | Tanaka ................................. 385/137 |

FOREIGN PATENT DOCUMENTS

| 184207 | * | 9/1985 | (JP) ..................................... 225/103 |
| 63-168603 | | 7/1988 | (JP) . |
| 4-123009 | | 4/1992 | (JP) . |
| 6-148436 | | 5/1994 | (JP) . |

OTHER PUBLICATIONS

Supplementary European Search Report dated Aug. 28, 2000.

* cited by examiner

Primary Examiner—Kenneth E. Peterson
Assistant Examiner—Stephen Choi
(74) Attorney, Agent, or Firm—Smith, Gambrell & Russell (57) ABSTRACT

It is intended to provide an optical fiber-cutting method and an optical fiber-cutting machine, by which an optical fiber can be cut smoothly and perpendicularly to the axis of the optical fiber. A ferrule 21 is held by a holder 14 which is supported in a slantingly movable fashion relative to the main body 12 of a cutting machine 11, and an end portion of the optical fiber 20 projecting from an end face of the ferrule 21 is held by a clamp 16 to apply a pulling force to the optical fiber. The holder 14 is slanted to bend the optical fiber 20, and a cutting blade 28 is moved in an arc line along the circumference of a basal portion at the inner side of the bending portion of the optical fiber 20 while butting the cutting blade 28 to the optical fiber 20, to make a cut 20a of an arc shape, and then the holder 14 is slanted toward the direction opposite to the above direction to bend the optical fiber 20 toward the direction opposite to the above direction, thereby cutting the optical fiber 20.

7 Claims, 7 Drawing Sheets

METHOD AND APPARATUS FOR CUTTING OPTICAL FIBER

TECHNICAL FIELD

The present invention relates to a cutting method wherein an end portion of an optical fiber is held by a ferrule and then a part of the optical fiber projecting from the end face of the ferrule is cut off so that the cut section will have a smooth surface along the end face of the ferrule, and a cutting machine for performing this method.

BACKGROUND ART

For connection of optical fibers to be used for optical communications or connection of an optical fiber with e.g. a light-emitting element or a light-receiving element, it is required that before the connection, end faces of the optical fibers are butted to each other or an end face of the optical fiber and e.g the light-emitting element or light-receiving element are butted to each other.

For this purpose, a holder of cylindrical shape called a ferrule is attached to an end portion of the optical fiber, and the holder is inserted into an optical connector or the like for connection. In this case, it is required to cut a part of the optical fiber projecting from the end face of the ferrule so that the cut section will have a smooth surface along the end face of the ferrule.

As to the cutting method, various methods have heretofore been proposed. However, in order to avoid the necessity of polishing the end face of the optical fiber after cutting, a cutting technique has been desired by which the cut section will be smooth.

As one such technique, a method has been proposed in Japanese Unexamined Patent Publication No. 63-168603 wherein an optical fiber is cut by making a cut around a bare optical fiber while applying a tension to the bare optical fiber.

Further, Japanese Unexamined Patent Publication No. 6-148436 discloses a machine for cutting an optical fiber which comprises a ferrule-holding means through which a ferrule is inserted for holding and the slant angle of which is changeable; a chucking means for chucking a forward end portion of the optical fiber projecting from the ferrule; a cutting means for cutting the portion of the optical fiber projecting from the ferrule along the end face of the ferrule; and a slant angle-finely adjusting means for finely adjusting the slant angle of the ferrule-holding means, wherein the slant angle of the ferrule-holding means is finely adjusted by means of the slant angle-finely adjusting means depending upon the type or diameter of the optical fiber, to bend the optical fiber in the vicinity of the end face of the ferrule, and the bending portion is cut by means of the cutting means. The cutting means is constructed so that the optical fiber is cut at the stretched side of the bending portion.

Further, Japanese Unexamined Patent Publication No. 4-123009 discloses a method for cutting a forward end portion of an optical fiber which comprises attaching an optical fiber to a ferrule so that the forward end portion of the optical fiber will slightly project; clamping the forward end of the optical fiber while applying a pulling force to the optical fiber by means of a clamping means; while keeping this state, slanting the optical fiber relative to the central axis of the ferrule from the site corresponding to the forward end face of the ferrule; making a cut at the inner side of the slanting portion of the optical fiber along the forward end face of the ferrule; and then slanting the forward end portion of the optical fiber toward the opposite side while keeping the state where a pulling force is applied to the optical fiber.

However, the cutting method as disclosed in Japanese Unexamined Patent Publication No. 63-168603 is a method for cutting the optical fiber by making a cut around the optical fiber while simply pulling the optical fiber straightforward, and therefore has problems that the length of the cut and the smoothness of the cut section tend to be unstable due to the irregularity of e.g. pulling force or depth of the cut.

Further, in the cutting machine as disclosed in Japanese Unexamined Patent Publication No. 6-148436, an optical fiber is bent and a cut is made at the outer side of the bending portion for cutting. However, since the cut is made at the bending state and, at the same time, the cutting is conducted, the cut section after cutting is unlikely to be perpendicular to the axis of the optical fiber, i.e. in many cases, the cut is made obliquely, which leads to a problem that optical losses are likely to arise.

Further, in the cutting method as disclosed in Japanese Unexamined Patent Publication No. 4-123009, an optical fiber is bent toward a predetermined direction while applying a tension to the optical fiber, and a cut is made at the inner side of the bending portion, and then the optical fiber is bent toward the opposite direction for cutting. However, since a cutter is pressed against the optical fiber to make a cut at such a level that a scratch is simply formed at one portion, there are problems that when the optical fiber is bent toward the opposite direction, the cut section after cutting is unlikely to be perpendicular to the axis of the optical fiber, i.e. in many cases, the cut is made obliquely, as in the above conventional techniques. Further, since the contact point of the cutter and the optical fiber is limited to one point, there is a problem that adequate durability of the cutter can not be obtained.

Accordingly, the object of the present invention is to provide a method for cutting an optical fiber by which a part of the optical fiber projecting from the ferrule is cut off so that the cut section will be smooth and perpendicular to the axis of the optical fiber, and a cutting machine for carrying out the method.

DISCLOSURE OF THE INVENTION

To accomplish the above objects, in the first aspect, the present invention provides a method for cutting an optical fiber which comprises inserting an optical fiber into a ferrule so that the optical fiber is held by the ferrule and the optical fiber projects a predetermined length from an end face of the ferrule, and then cutting the projecting portion of the optical fiber along the end face of the ferrule, which is characterized by holding the ferrule and the projecting portion of the optical fiber, respectively, to apply a pulling force to the optical fiber; slanting an axis of the ferrule relative to the pulling direction of the optical fiber to bend the projecting portion of the optical fiber relative to the axis of the ferrule; making an arcuate cut at an inner side of the bending portion along the circumference of a basal portion of the projecting portion of the optical fiber; and then slanting the axis of the ferrule toward the direction opposite to the above slanted direction with respect to the pulling direction of the optical fiber to bend the projecting portion of the optical fiber toward the direction opposite to the above slanted direction with respect to the axis of the ferrule, thereby cutting the optical fiber along the end face of the ferrule.

Further, in the second aspect, the present invention provides a machine for cutting an optical fiber wherein an optical fiber is inserted into a ferrule so that the optical fiber is held by the ferrule and the optical fiber projects a predetermined length from an end face of the ferrule, and then the projecting portion of the optical fiber is cut along the end face of the ferrule, which is characterized by comprising a holder which is supported in a slantingly movable fashion relative to the machine main body and holds the ferrule in a detachable fashion; a clamp which holds the projecting portion of the optical fiber projecting from the end face of the ferrule and applies a pulling force to the optical fiber; and a cutting blade which is attached to the holder and moves arcuately while butting the blade against the optical fiber along the circumference of a basal portion of the projecting portion of the optical fiber.

In the third aspect, the present invention provides a machine for cutting an optical fiber wherein the holder comprises a plate-like member having a holding hole which fittingly holds the ferrule, which is supported in a slantingly movable fashion, relative to the machine main body, by means of a supporting axis which is perpendicular to the axis of the ferrule held in the holding hole, and is rotatively urged in a predetermined direction by means of a first elastic means, wherein a cam member is butted to the plate-like member in the direction of the rotation applied, and the holder is slantingly operated by moving the cam member.

In the fourth aspect, the present invention provides a machine for cutting an optical fiber wherein a lever is disposed to the holder, which is pivotally mounted by means of a supporting axis provided parallel to the axis of the ferrule and is rotatively urged in a predetermined direction by means of a second elastic means; a one side portion of the cutting blade is pivotally attached at the forward end of the lever; and a third elastic means is disposed for pressing the cutting blade against the circumference of the basal portion of the projecting portion of the optical fiber, wherein by rotating the lever against the second elastic means, the cutting blade is moved arcuately while butting the blade to the optical fiber along the circumference of the basal portion of the projecting portion of the optical fiber.

In the fifth aspect, the present invention provides a machine for cutting an optical fiber wherein the machine is constructed so that the lever is linkingly moved with the cam member and, by moving the cam member, the following operations can continuously be conducted: an operation of slanting the holder toward a predetermined direction to bend the projecting portion of the optical fiber toward a predetermined direction; an operation of moving the cutting blade arcuately while butting the cutting blade to the inner side of the bending portion of the optical fiber; and an operation of slanting the holder toward the direction opposite to the above direction to bend the optical fiber toward the direction opposite to the above direction.

In the sixth aspect, the present invention provides a machine for cutting an optical fiber wherein the cutting blade comprises a U-shaped frame member, one side portion of which is pivotally attached to the lever, and a blade main body which is disposed within the frame member and is pivotally mounted via a supporting axis which is perpendicular to the axis of the ferrule, wherein an elastic pressing means is interposed between the holder and the blade main body, to urge the blade main body so that an edge of the blade main body is butted to the circumference of the projecting portion of the optical fiber adjacent to the end face of the ferrule.

Further, in the seventh aspect, the present invention provides a machine for cutting an optical fiber wherein the edge of the blade main body has a shape chamfered along a planar face parallel to the end face of the ferrule.

According to the optical fiber-cutting method in the first aspect of the present invention, while applying a pulling force to the optical fiber, the axis of the ferrule is slanted to bend the optical fiber and an arcuate cut is made along the circumference of the basal portion of the projecting portion of the optical fiber from the inner side of the bending portion. When the cut is made at the inner side of the bending portion as above, no force is applied in a direction of opening the cut, and the optical fiber will not be cut in two at once. Then, when the axis of the ferrule is slanted toward the opposite direction to bend the optical fiber toward the opposite direction, the cut is opened and the optical fiber is instantaneously cut in two.

In this case, since the cut is made arcuately along the circumference of the basal portion of the projecting portion of the optical fiber, the cut section of the optical fiber is formed to be perpendicular to the axis of the optical fiber and have a properly smooth surface with good reproducibility. Further, since the cutting is conducted while applying a tension to the optical fiber, the optical fiber shrinks after cutting and moves back to the inside of the ferrule, whereby the end face of the optical fiber no longer projects from the end face of the ferrule. Accordingly, there is no need to polish the end face of the optical fiber after cutting, and excellent optical connection can be conducted with less optical loss.

Further, according to the optical fiber-cutting machine in the second aspect of the present invention, an optical fiber can be cut by holding a ferrule through which the optical fiber is inserted and supported, by means of a holder; holding the projecting portion of the optical fiber projecting from the ferrule by means of a clamp to apply a pulling force; while keeping this state, slanting the holder to bend the optical fiber toward a predetermined direction; making an arcuate cut at the circumference of the basal portion of the optical fiber by moving the cutting blade arcuately while butting the cutting blade to the inner side of the optical fiber; and then slanting the holder toward the direction opposite to the above to bend the optical fiber toward the direction opposite to the above. Namely, the cutting method of the first aspect of the present invention can be conducted with good operation efficiency.

According to the optical fiber-cutting machine in the third aspect of the present invention, slanting operation of the holder is conducted by moving the cam member, whereby it becomes possible to conduct the slanting operation of the holder properly and rapidly.

According to the optical fiber-cutting machine in the fourth aspect of the present invention, when the lever is rotated against the second elastic means, the cutting blade is pulled by the lever and moved together with the lever, whereas the cutting blade is urged by the third elastic means so that the edge thereof would be butted to the optical fiber, whereby the cutting blade moves arcuately along the circumference of the optical fiber while butting the edge to the optical fiber. As a result, it is possible to form an arcuate cut along the circumference of the optical fiber properly and rapidly.

According to the optical fiber-cutting machine in the fifth aspect of the present invention, only by moving the cam member, the following operations can continuously be conducted: an operation of slanting the holder toward a predetermined direction to bend the projecting portion of the optical fiber toward a predetermined direction; an operation of moving the cutting blade arcuately while butting the cutting blade to the inner side of the bending portion of the optical fiber; and an operation of slanting the holder toward the direction opposite to the above to bend the optical fiber toward the direction opposite to the above. Accordingly, it is possible to conduct the cutting of the optical fiber rapidly with good operation efficiency.

According to the optical fiber-cutting machine in the sixth aspect of the present invention, the edge of the blade main body of the cutting blade is pressed against a portion of the optical fiber which abuts to the end face of the ferrule by means of the elastic pressing means, whereby the optical fiber can be cut at the position as close as possible to the end face of the ferrule, and it is therefore possible to securely prevent the terminal cut end portion of the optical fiber from projecting from the end face of the ferrule.

According to the optical fiber-cutting machine in the seventh aspect of the present invention, the edge of the blade main body has the shape chamfered along the planar face parallel to the end face of the ferrule, whereby it is possible to prevent the edge from contacting with the end face of the ferrule and damaging the ferrule and the edge itself.

BEST MODE FOR CARRYING OUT THE INVENTION

FIGS. 1 to 13 show an example of the optical fiber-cutting machine of the present invention.

Figure 1:
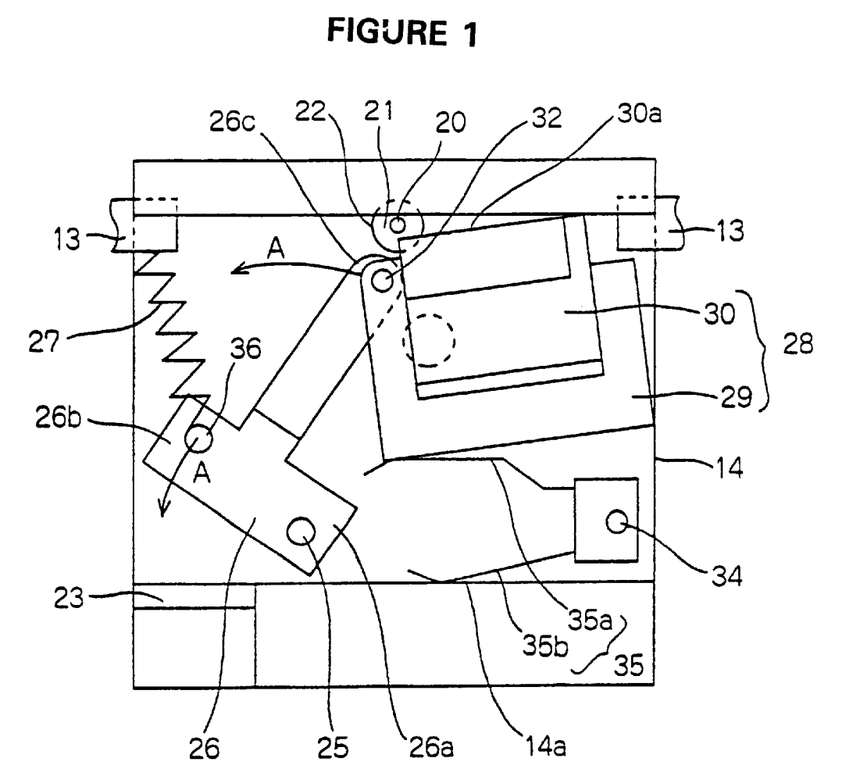
FIG. 1 is a plane view showing an operation mechanism of a holder and a cutting blade in one example of the optical fiber-cutting machine of the present invention, from the back face side.
Figure 2:
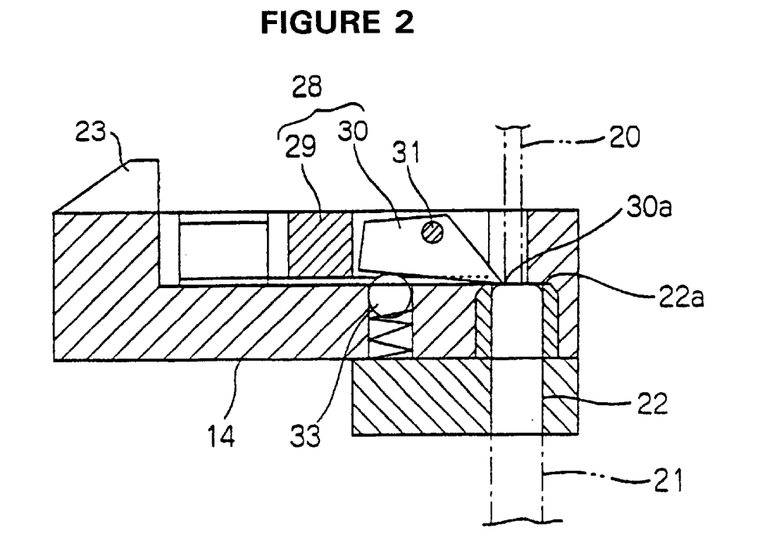
FIG. 2 is a side elevational view showing an operation mechanism of a holder and a cutting blade in the same example.
Figure 3:
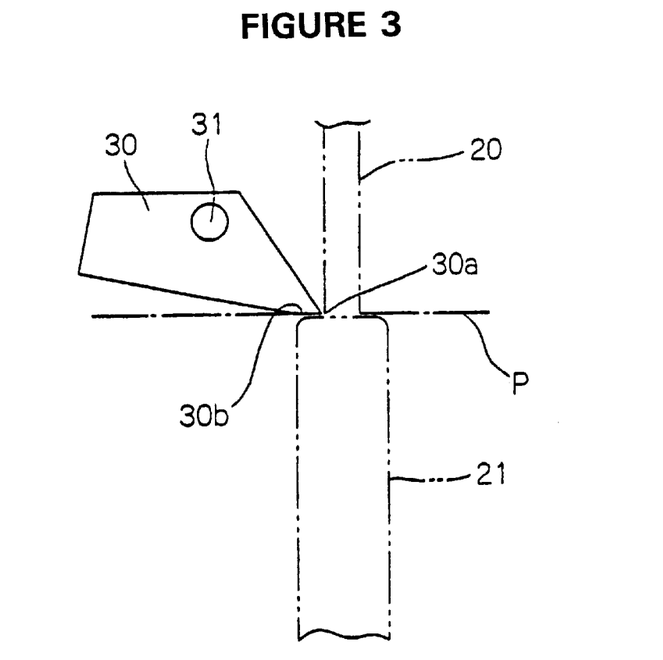
FIG. 3 is an enlarged view illustrating a shape of the edge of the cutting blade in the same example.
Figure 4:
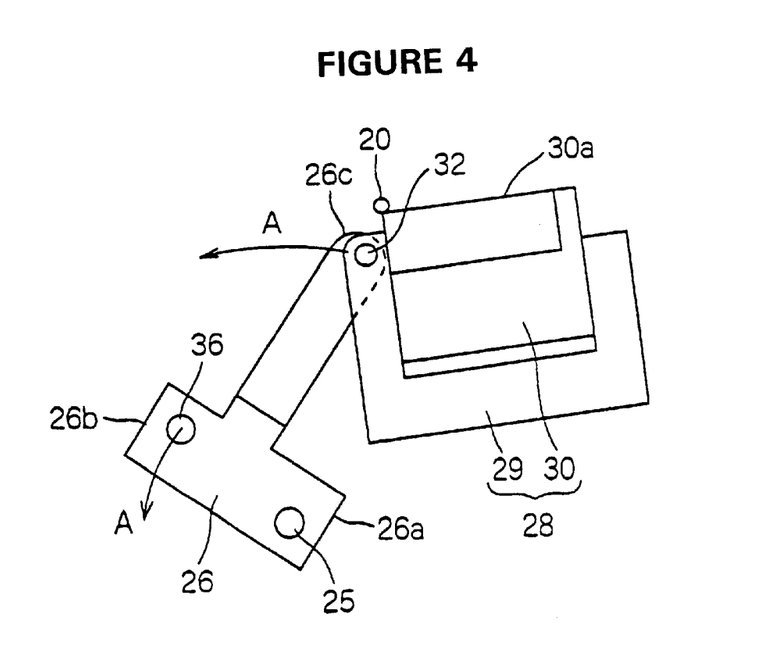
FIG. 4 is a view illustrating the state when the formation of a cut of the optical fiber starts, by means of the cutting blade in the same example.
Figure 5:
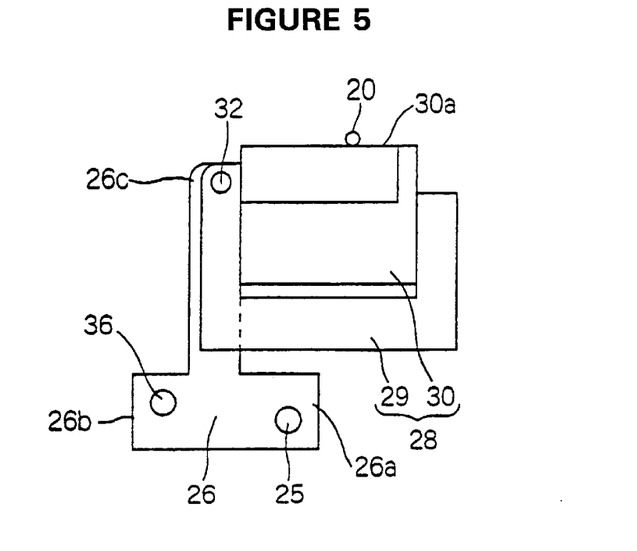
FIG. 5 is a view illustrating the state during the formation of the cut of the optical fiber, by means of the cutting blade in the same example.
Figure 6:
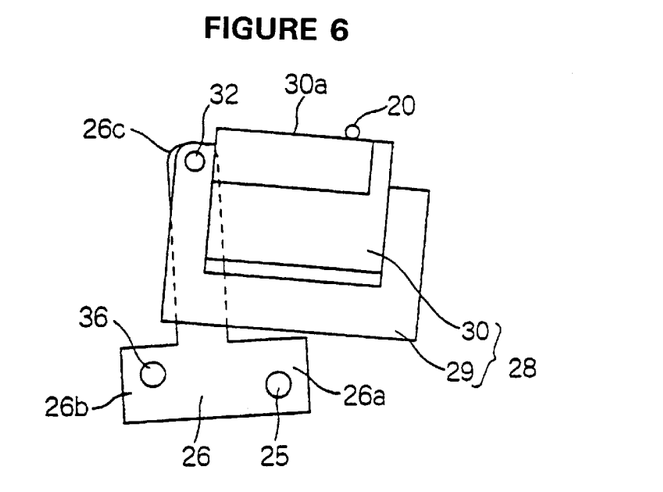
FIG. 6 is a view illustrating the state at the completion of the formation of the cut of the optical fiber, by means of the cutting blade in the same example.
Figure 7:
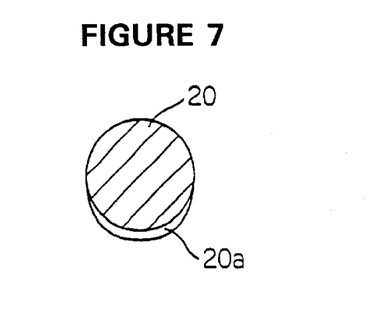
FIG. 7 is a sectional view showing the shape of the cut of the optical fiber in the same example.
Figure 8:
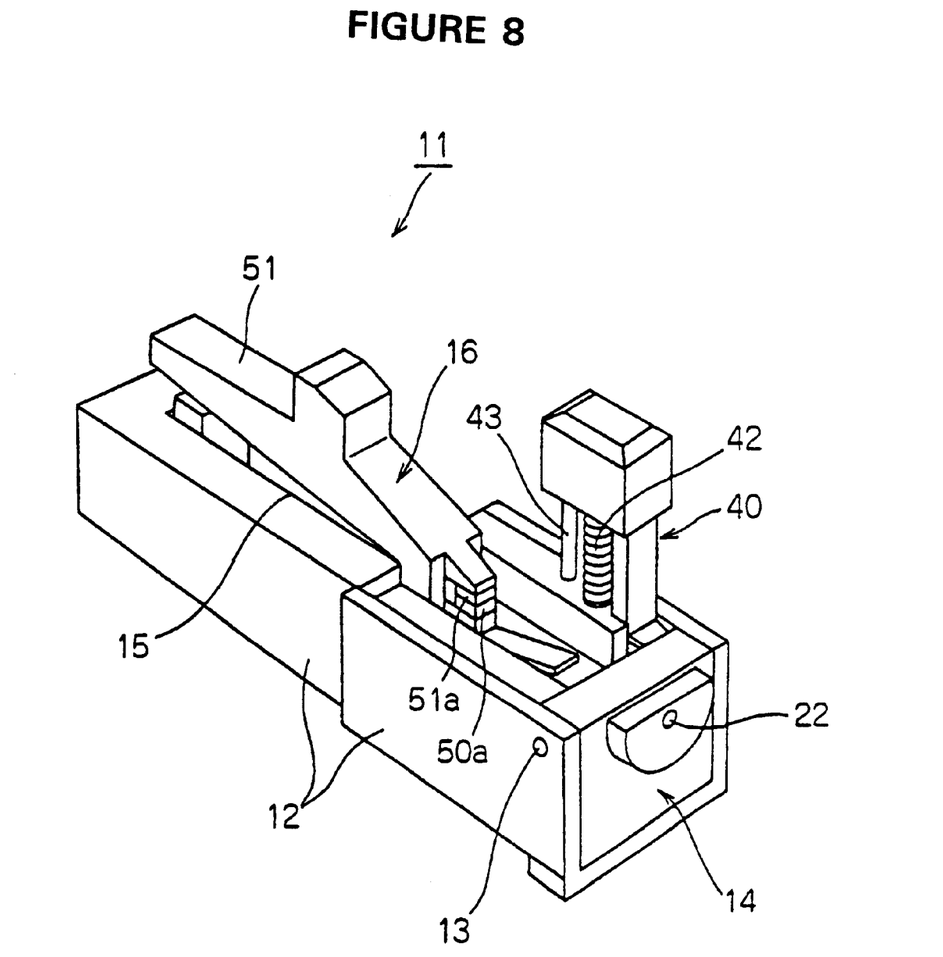
FIG. 8 is a perspective view showing the entire optical fiber-cutting machine of the same example.
Figure 9:
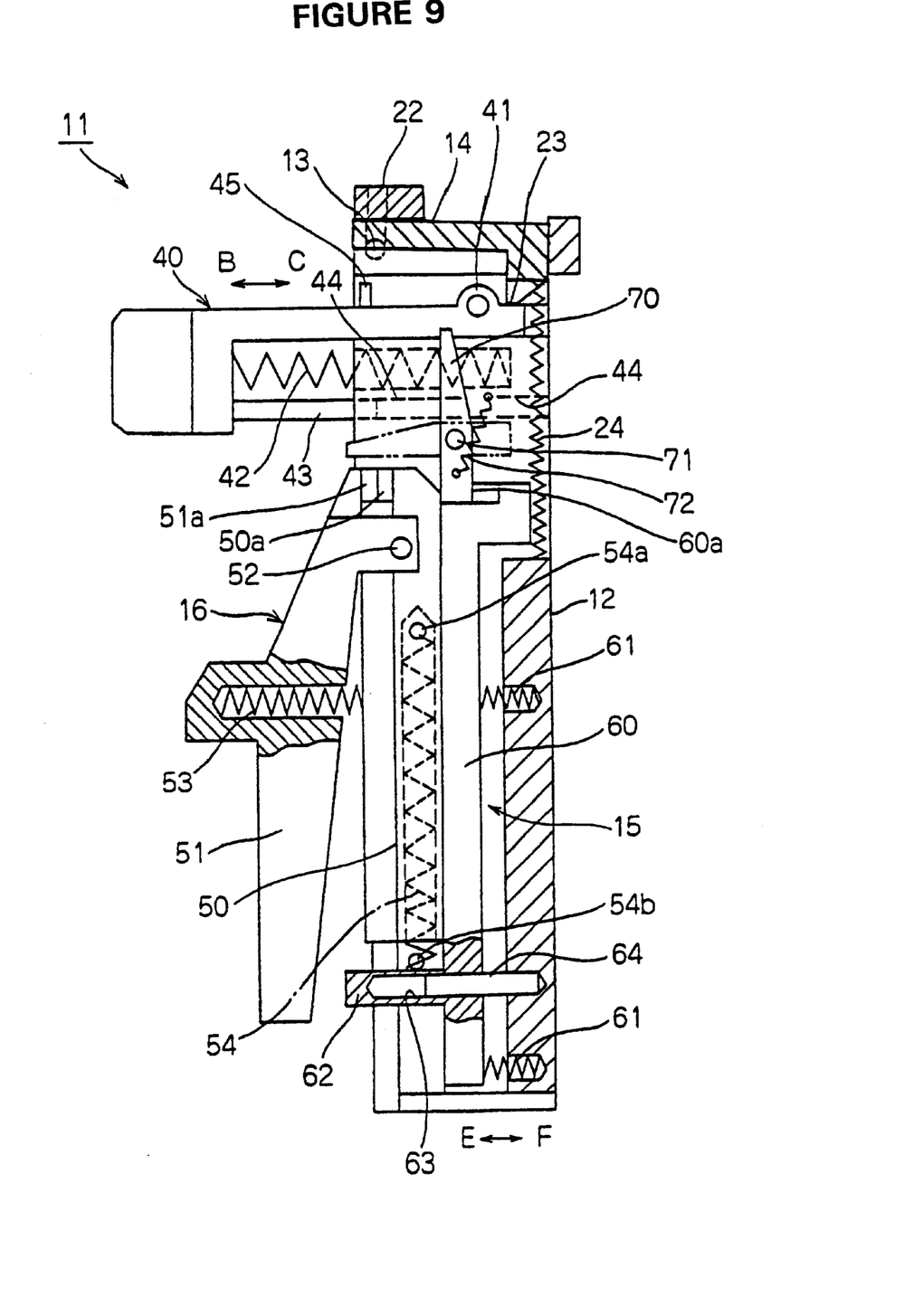
FIG. 9 is an elevational sectional view showing the entire optical fiber-cutting machine of the same example.
Figure 10:
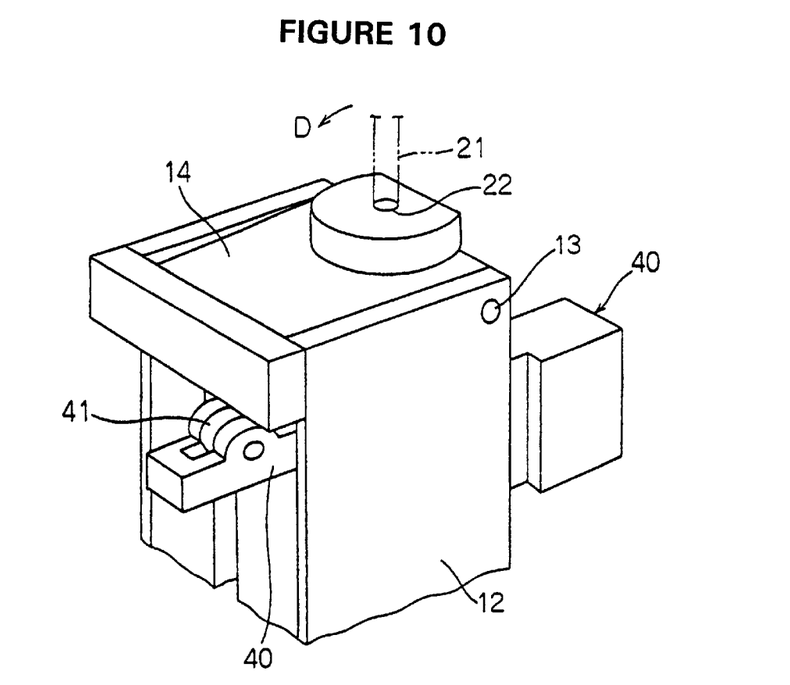
FIG. 10 is a perspective view showing the slanting state of the holder when making a cut in the optical fiber by means of the optical fiber-cutting machine of the same example.
Figure 11:
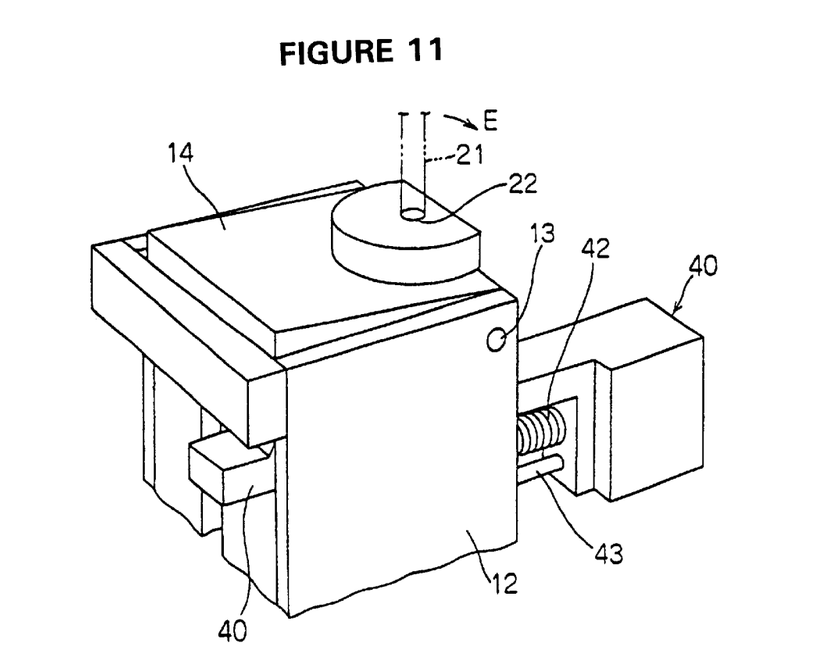
FIG. 11 is a perspective view showing the slanting state of the holder when bending the optical fiber toward the opposite direction by means of the optical fiber-cutting machine of the same example.
Figure 12:
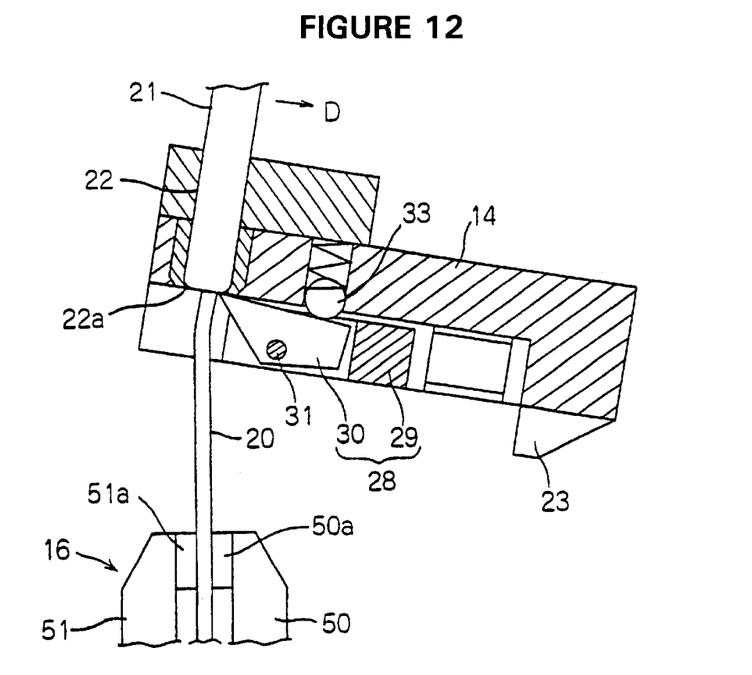
FIG. 12 is a partial sectional view showing the bending state of the optical fiber when making a cut in the optical fiber by means of the optical fiber-cutting machine of the same example.
Figure 13:
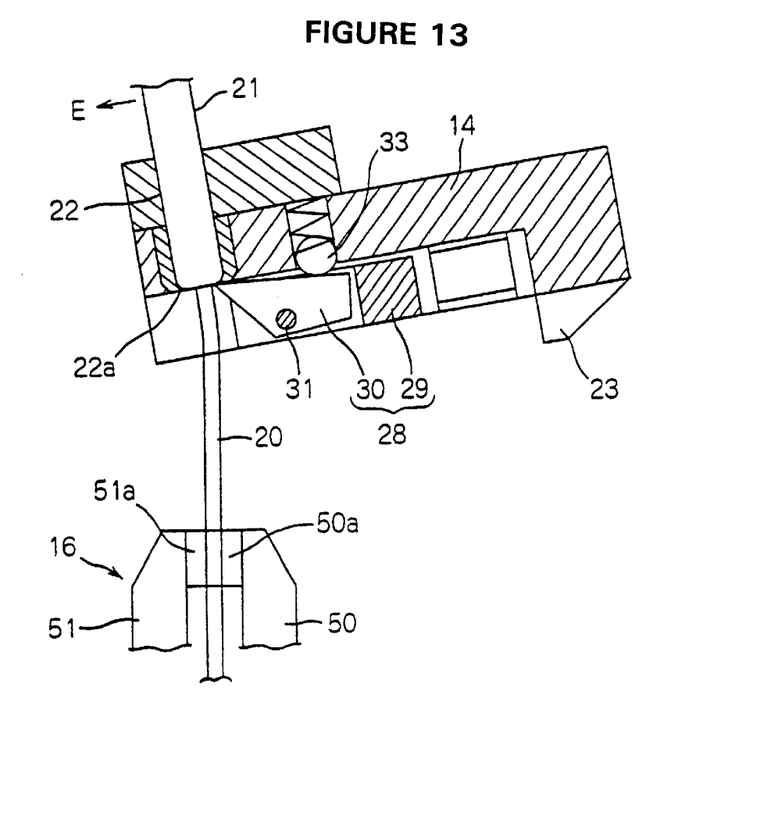
FIG. 13 is a partial sectional view showing the bending state of the optical fiber when bending the optical fiber toward the opposite direction to cut the optical fiber by means of the optical fiber-cutting machine of the same example.

FIG. 1 is a plane view showing an operation mechanism of a holder and a cutting blade, from the back face side. FIG. 2 is a side elevational view showing an operation mechanism of a holder and a cutting blade. FIG. 3 is an enlarged view illustrating a shape of the edge of the cutting blade. FIG. 4 is a view illustrating the state when the formation of a cut of the optical fiber starts, by means of the cutting blade. FIG. 5 is a view illustrating the state during the formation of the cut of the optical fiber, by means of the cutting blade. FIG. 6 is a view illustrating the state at the completion of the formation of the cut of the optical fiber, by means of the cutting blade in the same example. FIG. 7 is a sectional view showing the shape of the cut of the optical fiber. FIG. 8 is a perspective view showing the entire optical fiber-cutting machine. FIG. 9 is an elevational sectional view showing the entire optical fiber-cutting machine. FIG. 10 is a perspective view showing the slanting state of the holder when making a cut in the optical fiber by means of the cutting blade. FIG. 11 is a perspective view showing the slanting state of the holder when bending the optical fiber toward the opposite direction. FIG. 12 is a partial sectional view showing the bending state of the optical fiber when making a cut in the optical fiber. FIG. 13 is a partial sectional view showing the state where the optical fiber is bent toward the opposite direction to cut the optical fiber.

As shown in FIG. 8, this optical fiber-cutting machine 11 comprises a machine main body 12 having a square pillar shape as a whole, a plate-like holder 14 which is attached in a slantingly movable fashion to one end face of the machine main body 12 through a supporting axis 13, and a clamp 16 slidably disposed along a guide groove 15 formed in a longitudinal direction of the machine main body 12.

With also reference to FIGS. 1 and 2 for explaining the holder 14 in detail, the holder 14 has a holding hole 22 through which is inserted a ferrule 21 having an optical fiber inserted therein. At the innermost end portion of the holding hole 22, a claw portion 22a is disposed which fits to the end face of the ferrule 21. The ferrule 21 is inserted in and held by the holding hole 22 while fitting its circumference at the end face to the claw portion 22a.

Further, with also reference to FIG. 9, the holder 14 is rotatably supported at its both side face portions of one side by means of a supporting axis 13 which is inserted from the machine main body 12. At one end of its opposite side, the holder 14 has a projection portion 23 to which a roller cam 41 of a cam member 40 is butted. Further, the holder 14 is urged in such a direction that the holder 14 would be usually closed, i.e. in such a direction that the holder 14 would be butted to the cam member 40 by means of an extension coil spring 24 disposed with tension between the holder 14 and the machine main body 12. The extension coil spring 24 constitutes the first elastic means of the present invention.

With reference to FIGS. 1 and 2 again, at the back face of the holder 14, one end 26a of a T-shaped lever 26 is rotatably attached through a supporting axis 25 which is in parallel to the axis of the ferrule 21 held by the holder 14. An extension coil spring 27 is provided for connection between the holder 14 and a pin 36 disposed at the other end portion 26b of the lever 26, and always rotatively urges the lever 26 in a clockwise direction in FIG. 1. The above extension coil spring 27 constitutes the second elastic means of the present invention.

A cutting blade mechanism 28 comprises a U-shaped frame member 29 having its one side portion pivotally mounted by means of an axis 32 at another end portion 26c of the lever 26, and a blade main body 30 pivotally mounted by means of an axis 31 (reference may be made to FIG. 2) which is disposed within the frame member 29 and is perpendicular to the axis of the ferrule 21. And, a ball plunger 33 internally butting to the holder 14 is butted to the back face of the blade main body 30 to urge the blade main body 30 so that the edge 30a of the blade main body 30 would be butted to a basal portion of the optical fiber 20 which is adjacent to the end face of the ferrule 21.

Further, to the holder 14, an open spring 35 having a pair of spring pieces 35a, 35b is attached via a supporting axis 34, wherein the spring piece 35a is butted to the back face of the frame member 29 of the cutting blade mechanism 28 and the other spring piece 35b is butted to a stepped portion 14a of the holder 14 so that the edge 30a of the blade main body 30 of the cutting blade mechanism 28 would be pressed against the optical fiber 20. The open spring 35 constitutes the third elastic means of the present invention.

Meanwhile, as shown in FIG. 3, a portion 30b adjacent to the edge 30a of the back face of the blade main body 30 has a shape chamfered along a face P which is in parallel to the end face of the ferrule 21, to prevent the edge 30a from contacting with the end face of the ferrule 21 so that the edge 30a itself and the ferrule 21 would not be damaged.

As shown in FIGS. 8 and 9, the cam member 40 is urged in the arrow B direction in FIG. 9 by means of coil spring 42 interposed between the cam member 40 and the machine main body 12. Further, to the cam member 40, a guide rod 43 for slidably guiding it is disposed, and the guide rod 43 is inserted into a guide hole 44 of the machine main body 12. Further, a claw piece 45 is attached to the cam member 40, and when the cam member 40 is slid toward the arrow C direction in FIG. 9 against the compression coil spring 42, this claw piece 45 is engaged with the pin 36 in FIG. 1 to rotate the lever 26 in the arrow A direction in FIG. 1.

And, after the cam member 40 is slid and crammed in the arrow C direction in FIG. 9 against the compression coil spring 42, so that the roller cam 41 of the cam member 40 would climb over the projection 23 of the holder 14, a side portion of the holder 14 at the side opposite of the supporting axis 13 is recessed, whereby the ferrule 20 is slightly slanted in the arrow D direction as shown in FIG. 10. FIG. 12 is a cross-sectional view showing this state, and the D direction in FIG. 10 corresponds to the D direction in FIG. 12.

Further, when the cam member 40 is slid and completely crammed in the arrow C direction in FIG. 9, and then slid so that it would return in the arrow B direction by the resilience of the compression coil spring 42 and the roller cam 41 of the cam member 40 would be stuck on the projection 23 of the holder 14, the side portion of the holder 14 at the side opposite of the supporting axis 13 rises upward and the ferrule 20 slants in the arrow E direction i.e. reverse to the above, as shown in FIG. 11. FIG. 13 is a sectional view showing this state, and the E direction in FIG. 11 corresponds to the E direction in FIG. 13.

With reference to FIGS. 8 and 9 again, the clamp 16 has a base portion 50 inserted into the guide groove 15 and a lever 51 rotatably attached to the base portion 50 via a supporting axis 52, and the forward end portion 50a of the base portion 50 and the forward end portion 51a of the lever 51 constitute the clamp portion. Further, by means of a compression coil spring 53 interposed between the base portion 50 and the lever 51, the lever 51 is always urged in such a direction that the clamp portion would be closed.

Further, to the rearward end portion of the base portion 50, one end 54a of the extension coil spring 54 is fixingly inserted, and another end 54b of the extension coil spring 54 is fixed to the inner wall of the guide groove 15 of the machine main body 12. As a result, the clamp 16 is always pulled rearward (lower portion in FIG. 9) by means of the extension coil spring 54.

Between the lower side of the base portion 50 of the clamp 16 and the bottom wall of the guide groove 15, a long rod-like movable member 60 is disposed. The movable member 60 is always urged so that it butts to the clamp 16 by means of a plurality of compression coil springs 61 interposed between the movable member 60 and the bottom wall of the guide groove 15. Further, at the rear portion of the movable member 60, a projection 62 which projects toward the lever 51 of the clamp 16, is formed, and into a guide hole 63 formed therein, a guide rod 64 projecting from the bottom wall of the guide groove 15 is inserted. The guide rod 64 supports the movable member 60 so that the movable member 60 would be moved in the arrow E or F direction in FIG. 9.

Further, at a part of the machine main body 12 in the vicinity of the forward end portion of the movable member 60, a patting rod 70 is rotatably attached via a supporting axis 71. The patting rod 70 is rotatively urged toward the direction as shown by the broken line in FIG. 9 by means of an extension coil spring 72 disposed with tension between one end of the patting rod 70 and the machine main body 12. When the patting rod 70 is rotated against the extension coil spring 72 so that it would extend along the longitudinal direction of the movable member 60, the patting rod 70 is engaged with a forward end portion 60a of the movable member 60 and held at the rotated position.

The patting rod 70 is released from this engagement when the movable member 60 is moved in the arrow F direction in FIG. 9, and rotated to the position as indicated by the imaginary line in FIG. 9 by a resilience of the extension coil spring 72, whereby the cut and removed optical fiber held by the forward end portions 50a, 51a of the clamp 16 will be struck down into a scrap-receiving hole portion formed at the base portion 50 of the clamp 16 and not shown in the drawings.

An example of the optical fiber-cutting method of the present invention, using the optical fiber-cutting machine having the above structure, will be explained.

Firstly, the optical fiber 20 is inserted into and held by the ferrule 21 so that the forward end portion of the optical fiber 20 slightly projects from the end face of the ferrule 21. As such ferrule 21, various conventional ones may be used, and, for example, the one described in Japanese Patent Application No. 6-329979 filed by the applicants is preferably used. The optical fiber is clamped by a pair of hollow members of the ferrule, each having a cross-section of a semicircular form, and the circumference of the hollow members is pressed by a cylindrical holder so that the optical fiber would be clamped and held via the hollow members.

The optical fiber 20 is held by the ferrule 21 as above, and then the ferrule 21 is inserted into the holding hole 22 of the holder 14 and the end face of the ferrule 21 is fittingly held by the claw portion 22a of the holding hole 22.

Then, the lever 51 of the clamp 16 is pressed down against the extension coil spring 53 to open the forward end portions 50a, 51a of the clamp 16, and then at this state, the clamp 16 is pulled and slid toward the holder 14 along the guide groove 15 against the extension coil spring 54. The patting rod 70 located at the position indicated by the broken line in FIG. 9 is thereby pressed by the forward end portion of the clamp 16 and rotated to the position indicated by the solid line in FIG. 9 against the extension coil spring 72. At this time, the lever 51 presses down the projection 62 of the movable member 60, by which the forward end portion 60a of the movable member 60 is moved back to the position at which it would not interfere with the base portion of the patting rod 70, whereby the patting rod 70 can be rotated.

At this state, the forward end portion of the optical fiber 20, projecting from the end face of the ferrule 21, is inserted between the forward end portions 50a, 51a of the clamp 16, and when the lever 51 is released to return the lever 51 back to the original position by the resilience of the compression coil spring, the projecting portion of the optical fiber 20 is clamped by the forward end portions 50a, 51a of the clamp 16. Further, the clamp 16 is returned back rearward by means of the extension coil spring 54, and pulls the optical fiber 20 to impart a tension to the optical fiber 20. Further, when the lever 51 returns to the original position, the movable member 60 is returned to the original position by the resilience of the compression coil spring 61, and the base portion of the patting rod 70 engages with the forward end portion 60a of the movable member 60, whereby the patting rod 70 is held at the position as indicated by the solid line in FIG. 9.

Then, the cam member 40 is crammed in the arrow C direction in FIG. 9 against the compression coil spring 42. After the roller cam 41 of the cam member 40 climbs over the projection 23 of the holder 14, the side portion of the holder 14 at the opposite side of the supporting axis 13, sinks downward so that the holder would slant as shown in FIG. 10. As a result, as shown in FIG. 12, the ferrule 21 slants toward the D direction in the figure, whereby the optical fiber 20, one end of which is held by the ferrule 21 and another end of which is held and pulled by the clamp 16, is bent, and the edge 30a of the blade main body 30 of the cutting blade 28 is butted to the basal portion at the inner side of the bending portion.

At the above state, when the cam member 40 is further crammed, the claw piece 45 attached to the cam member 40 (reference may be made to FIG. 9) engages with the pin 36 of the lever 26 (reference may be made to FIG. 1) to rotate the lever 26 in the arrow A direction in FIG. 1. At this time, the edge 30a of the blade main body 30 of the cutting blade 28 is buttingly pressed against the optical fiber 20 by the resilience of the open spring 35. Further, the edge 30a of the blade main body 30 is buttingly pressed to the position adjacent to the end face of the ferrule 21 of the optical fiber 20.

As the lever 26 rotates in the arrow A direction, the edge 30a of the blade main body 30 of the cutting blade 28 moves arcuately along the circumference of the optical fiber 20 as shown in FIGS. 4 to 6, to make an arcuate cut at the circumference of the optical fiber 20. As a result, an arcuate cut 20a is formed on the optical fiber 20 as shown in FIG. 7. Since the cut 20a is formed at the inner side of the bending portion of the optical fiber 20 in FIG. 12, the optical fiber 20 is not broken at this time.

After the cam member 40 is crammed as above, when the cam member 40 is released, the cam member 40 moves in the arrow B direction in FIG. 9 to return to the original position by the resilience of the compression coil spring 42. During the cam member 40 return, the roller cam 41 of the cam member 40 is stuck on the projection 23 of the holder 14 (accurately, the roller cam 41 pushes up the projection 23), whereby the side portion of the holder 14 at the opposite side of the supporting axis 13 is pushed upward to slant the holder 14 as shown in FIG. 11.

As a result, the ferrule 21 slants toward the E direction as shown in FIG. 13, whereby the optical fiber 20, one end of which is held by the ferrule 21 and another end of which is held and pulled by the clamp 16, is bent toward the reverse direction of the case of FIG. 12, i.e. toward such a direction that the arcuate cut 20a formed on the optical fiber 20 would open, and a broken line is thereby formed at once along the arcuate cut 20a of the optical fiber 20 to cut (break) the optical fiber 20.

As mentioned above, the optical fiber 20 is cut (broken) along the arcuate cut 20a. Accordingly, the cut section has a smooth surface for which no post-polishing is required, and is perpendicular to the axis of the optical fiber 20. As a result, it is possible to reduce the optical loss when the optical fibers 20 are connected to each other, or the optical fiber 20 is connected to e.g. a light-emitting device or a light-receiving device via e.g. a connector.

When the optical fiber is cut as mentioned above, the clamp 16 is drawn backward by the resilience of the extension coil spring 54. At this state, when the lever 51 of the clamp 16 is pressed down against the compression coil spring 53, the forward end portions 50a, 51a of the clamp 16 are opened, and at the same time, the projection 62 is pressed by the lever 51 to move the movable member 62 in the arrow F direction in FIG. 9. As a result, the engagement between the forward end portion 60a of the movable member 60 and the base portion of the patting rod 70 is unlocked, whereby the patting rod 70 is rotated to the position as indicated by the broken line in FIG. 9 by the resilience of the extension coil spring 72, to strike down the end portion as a scrap of the optical fiber 20, held by the forward end portions 50a, 51a of the clamp 16, into the scrap-receiving hole not shown in the figure.

By repeating the above operation, the projecting end portion of the optical fiber 20 held by the ferrule 21 can be cut rapidly by a simple operation.

As mentioned above, according to the present invention, which comprises slanting the axis of the ferrule while applying a pulling force to the optical fiber, to bend the optical fiber; moving the cutting blade arcuately along the circumference of the basal portion of the projecting portion of the optical fiber from the inner side of the bending portion to make an arcuate cut; and then slanting the axis of the ferrule toward the opposite direction to bend the optical fiber toward the opposite direction, by which the optical fiber is bent so that the cut would be opened, and cut (broken), it is possible to effect the cutting operation so that the cut section would have a smooth surface for which no post-polishing is required after cutting and is perpendicular to the axis of the optical fiber.

What is claimed is:

1. A machine for cutting an optical fiber held by a ferrule such that a predetermined length of the optical fiber extends from an end face of the ferrule, thereby providing a projecting portion of the optical fiber extending from the ferrule, the machine comprising:
   a main body;
   a holder including a first end which is pivotally mounted to the main body about a first supporting axis in a pivotably movable fashion relative to the main body, wherein the holder holds the ferrule in a detachable fashion such that the ferrule may be separated from the main body and the holder;
   a clamp, which holds the projecting portion of the optical fiber projecting from the end face of the ferrule, wherein the clamp applies a pulling force to the optical fiber, and wherein the clamp is slidably disposed on the main body;

a cutting blade mechanism, including a cutting blade, wherein the cutting blade mechanism is movably attached to the holder; and means for moving the cutting blade mechanism such that the cutting blade moves in an arc and along a circumference of a basal portion of the projecting portion of the optical fiber, wherein the means for moving includes a lever connected to the holder, wherein the lever is pivotally mounted to the holder about a second supporting axis provided parallel to an axis of the ferrule when the ferrule is held in the holder, and wherein the lever is rotatively urged about the second supporting axis in a first predetermined direction by means of a second elastic means;

wherein a first side portion of the cutting blade mechanism is pivotally attached at a first end of the lever; and wherein a third elastic means is disposed for pressing the cutting blade mechanism against the circumference of the basal portion of the projecting portion of the optical fiber, wherein by rotating the lever against the second elastic means, the cutting blade is moved in the arc while butting against the optical fiber.

2. The machine for cutting an optical fiber according to claim 1, further including:

a cam member movably mounted on the main body, wherein the lever is linkingly moved with the cam member so that by moving the cam member, the following operations are carried out:
  (a) the holder is slanted in a second predetermined direction to bend the projecting portion of the optical fiber in the second predetermined direction;
  (b) the cutting blade mechanism is moved in the arc while butting the cutting blade against an inner side of the bending portion of the optical fiber; and
  (c) the holder is slanted in a third predetermined direction opposite to the second predetermined direction to bend the optical fiber toward the third predetermined direction.

3. The machine for cutting an optical fiber according to claim 2, wherein the cutting blade mechanism comprises: (a) a U-shaped frame member, one side portion of which is pivotally attached to the lever, and (b) a blade main body, which is disposed within the frame member and is pivotally mounted via a third supporting axis, wherein the third supporting axis is perpendicular to the axis of the ferrule when the ferrule is mounted in the holder, wherein an elastic pressing means is interposed between the holder and the blade main body to urge the blade main body so that the cutting blade, which is coupled to the blade main body, is butted against the circumference of the projecting portion of the optical fiber adjacent to the end face of the ferrule.

4. The machine for cutting an optical fiber according to claim 1, wherein the cutting blade mechanism comprises: (a) a U-shaped frame member, one side portion of which is pivotally attached to the lever, and (b) a blade main body, which is disposed within the frame member and is pivotally mounted via a third supporting axis, wherein the third supporting axis is perpendicular to the axis of the ferrule when the ferrule is mounted in the holder, wherein an elastic pressing means is interposed between the holder and the blade main body to urge the blade main body so that the cutting blade, which is coupled to the blade main body, is butted against the circumference of the projecting portion of the optical fiber adjacent to the end face of the ferrule.

5. A machine for cutting an optical fiber held by a ferrule such that a predetermined length of the optical fiber extends from an end face of the ferrule, thereby providing a projecting portion of the optical fiber extending from the ferrule, the machine comprising:

a main body;

a holder comprising a plate member having a holding hole defined therein which fittingly holds the ferrule, which holder includes a first end which is pivotally mounted to the main body about a first supporting axis in a pivotably movable fashion relative to the main body, wherein the holder holds the ferrule in a detachable fashion such that the ferrule may be separated from the main body and the holder, and wherein the first supporting axis is perpendicular to an axis of the ferrule when the ferrule is held in the holding hole;

a clamp, which holds the projecting portion of the optical fiber projecting from the end face of the ferrule, wherein the clamp applies a pulling force to the optical fiber, and wherein the clamp is slidably disposed on the main body;

a cutting blade mechanism, including a cutting blade, wherein the cutting blade mechanism is movably attached to the holder, wherein the cutting blade mechanism comprises:
  (a) a U-shaped frame member, one side portion of which is pivotally attached to a rotatable lever, and
  (b) a blade main body, which is disposed within the frame member and is pivotally mounted via a second supporting axis, wherein the second supporting axis is perpendicular to the axis of the ferrule when the ferrule is mounted in the holder, wherein an elastic pressing means is interposed between the holder and the blade main body to urge the blade main body so that the cutting blade, which is coupled to the blade main body, is butted against the circumference of the projecting portion of the optical fiber adjacent to the end face of the ferrule;

means for moving the cutting blade mechanism such that the cutting blade moves in an arc and along a circumference of a basal portion of the project in portion of the optical fiber;

a cam member; and a first elastic means, wherein the first elastic means rotatively urges the plate member of the holder in a first predetermined direction to butt against the cam member, and wherein the cam member is movably mounted to move the plate member in a direction opposite the first predetermined direction.

6. The machine for cutting an optical fiber according to claim 5, wherein the cutting blade has a shape chamfered along a planar face parallel to the end face of the ferrule.

7. A machine for cutting an optical fiber held by a ferrule such that a predetermined length of the optical fiber extends from an end face of the ferrule, thereby providing a projecting portion of the optical fiber extending from the ferrule, the machine comprising:

a main body;

a holder comprising a plate member having a holding hole defined therein which fittingly holds the ferrule, which holder includes a first end which is pivotally mounted to the main body about a first supporting axis in a pivotably movable fashion relative to the main body, wherein the holder holds the ferrule in a detachable fashion such that the ferrule may be separated from the main body and the holder, and wherein the first supporting axis is perpendicular to an axis of the ferrule when the ferrule is held in the holding hole;

a clamp, which holds the projecting portion of the optical fiber projecting from the end face of the ferrule, wherein the clamp applies a pulling force to the optical fiber, and wherein the clamp is slidably disposed on the main body;

a cutting blade mechanism, including a cutting blade, wherein the cutting blade mechanism is movably attached to the holder;

means for moving the cutting blade mechanism such that the cutting blade moves in an arc and alone a circumference of a basal portion of the projecting portion of the optical fiber;

a cam member; and a first elastic means, wherein the first elastic means rotatively urges the plate member of the holder in a first predetermined direction to butt against the cam member, and wherein the cam member is movably mounted to move the plate member in a direction opposite the first predetermined direction, wherein the means for moving includes a lever connected to the holder, wherein the lever is pivotally mounted to the holder about a second supporting axis provided parallel to the axis of the ferrule when the ferrule is held in the holder, and wherein the lever is rotatively urged about the second supporting axis in a second predetermined direction by means of a second elastic means;

wherein a first side portion of the cutting blade mechanism is pivotally attached at a first end of the lever; and wherein a third elastic means is disposed for pressing the cutting blade mechanism against the circumference of the basal portion of the projecting portion of the optical fiber, wherein by rotating the lever against the second elastic means, the cutting blade is moved in the arc while butting against the optical fiber.

* * * * *

UNITED STATES PATENT AND TRADEMARK OFFICE
CERTIFICATE OF CORRECTION

PATENT NO.    : 6,244,488 B1
DATED         : June 12, 2001
INVENTOR(S)   : Tanaka It is certified that error appears in the above-identified patent and that said Letters Patent is hereby corrected as shown below:

<u>Title page,</u>
Item [73], Assignee, change "Asahi Kohden Co., Ltd., Kanagawa (JP)" to
-- Kawamura Electric Wire Industries, Ltd., Osaka, JAPAN --

Signed and Sealed this

First Day of October, 2002

Attest:

Attesting Officer

JAMES E. ROGAN
*Director of the United States Patent and Trademark Office*